United States Patent [19]

Hugdahl

[11] Patent Number: 4,771,674
[45] Date of Patent: Sep. 20, 1988

[54] DEVICE FOR REGULATING PRESSURE FLUID CYLINDERS

[76] Inventor: Mats Hugdahl, Millnäs Gård, S-150 12, Stjärnhov, Sweden

[21] Appl. No.: 905,524

[22] Filed: Sep. 10, 1986

[30] Foreign Application Priority Data

Sep. 19, 1985 [SE] Sweden .................. 8504344

[51] Int. Cl.⁴ ........................................ F15B 13/16
[52] U.S. Cl. ................................... 91/217; 91/390; 91/433
[58] Field of Search ............. 91/216 R, 217, 390, 91/433

[56] References Cited

U.S. PATENT DOCUMENTS

| | | | |
|---|---|---|---|
| 3,028,175 | 4/1962 | Eckman | 91/390 |
| 3,060,963 | 10/1962 | Jackson et al. | 91/390 X |
| 3,401,601 | 9/1968 | Velicer | 91/390 X |
| 3,807,277 | 4/1974 | LaSpisa et al. | 91/390 X |
| 3,946,559 | 3/1976 | Stevenson | 91/390 X |
| 4,215,851 | 8/1980 | Holmen | 91/390 X |
| 4,326,448 | 4/1982 | Lejon | 91/390 X |
| 4,463,658 | 8/1984 | Heiser et al. | 91/390 X |

Primary Examiner—Robert E. Garrett
Assistant Examiner—Mark A. Williamson
Attorney, Agent, or Firm—Cushman, Darby & Cushman

[57] ABSTRACT

A method and device for adjusting pressure fluid cylinders, the fluid being a compressible gas such as air and the cylinder being double-acting and receiving a piston (2). A force transmitting means (12, 20, 24) sensing the load of a cylinder generates a signal corresponding to the size of the load which signal is led to a pressure regulating means (17) adjusting the pressure in the cylinder (1) in dependence of the signal so that this will balance a force acting on the piston rod (3). The load-carrying piston (2) is then positioned in a stationary position relative to the cylinder (1).

4 Claims, 2 Drawing Sheets

DEVICE FOR REGULATING PRESSURE FLUID CYLINDERS

FIELD OF THE INVENTION

This invention relates to a method and a device for regulating pressure fluid cylinders in accordance with the preambles of claims 1 and 4.

BACKGROUND OF THE INVENTION

Pressure-fluid-operated, especially compressed-air-operated control cylinders—compressed-air-cylinders—are often used to provide linear motions. These operating cylinders are almost exclusively installed to work between two fixed stops, usually the two end positions of the piston. In case the piston is to enter the position between the two end positions a brake means or some other type of mechanical stop is required. The reason for this is that the pressure fluid—the air -is compressible and therefore cannot keep the piston in a distinct fixed position if it is actuated by an outer force or load that may vary from time to time or in time.

However, when a brake means or a mechanical stop is used the piston will both start and stop with a heavy jerk due to the fact that the piston is loaded by a sufficiently great fluid pressure in order that it might not "sink through" at the start and the piston cannot be stopped in correct position merely by reducing the pressure.

The problem is well-known, and for said reason cylinders are mostly used which operate with incompressible fluid hydraulics when it is desired to position the piston in definite, arbitrarily selected positions. The supply of pressure fluid—oil—is blocked by the aid of valves, the piston being locked in the intended position. However, hydraulic systems have disadvantages in the form of great installation costs, expensive operation and maintenance. Moreover, there is also a risk that leakage of the hydraulic oil can involve inconvenience.

SUMMARY OF THE INVENTION

Accordlingly this invention relates to a method for accurately positioning pressure fluid cylinders—compressed-air cylinders—which is possible as the invention has been given the characteristic features defined in the claims.

BRIEF DESCRIPTION OF THE DRAWINGS

The invention will be described in greater detail in the form of examples with reference to the drawing, wherein.

DETAILED DESCRIPTION OF THE PREFERRED EMBODIMENT

Figure 1:
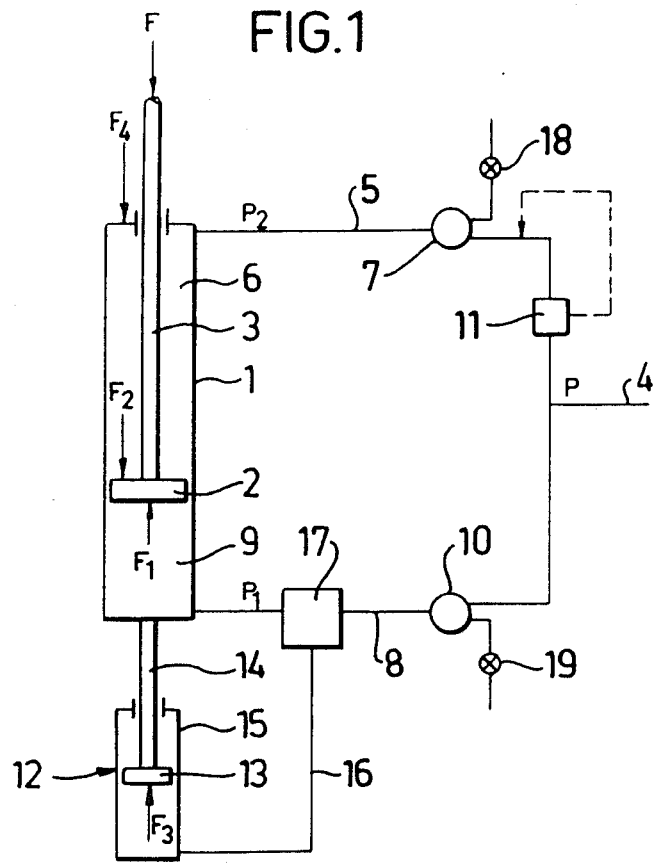
FIG. 1 shows schematically a skeleton diagram of the invention.

In the figures 1 designates a pressure fluid cylinder, preferably a compressed-air cylinder. A piston 2 with piston rod 3 is moveable in the cylinder 1. In the examples shown the piston rod is preferably connected with an outer means, the motion of which is produced by means of the motion of the piston 2. The force from this outer means (not shown) will load the piston 2 via the piston rod 3 by an outer force F. Moreover, another outer force $F_4$ acts on the cylinder 1 which is intended to maintain an initial pressure in a force transmitting means 12 to be described below.

The pressure fluid—compressed-air—is supplied via a conduit 4 at the pressure p. The conduit 4 branches off with one member 5 leading to the upper chamber 6 of the cylinder via a multi-way valve 7, e.g. a 3/2-valve and with one member 8 leading to the lower chamber 9 of the cylinder via a second mult-way valve 10, also e.g. a 3/2-valve.

Air adjusted to a constant pressure $P_2$ through a pressure regulating unit 11 is supplied to the upper chamber 6 of the cylinder. The air is supplied to the chamber via the multi-way valve 7 by means of which it is possible also to evacuate the chamber 6. The air forces on the upper side of the piston 2 are designated $F_2$ and derive from the pressure $P_2$.

The lower chamber 9 of the cylinder obtains air via the multi-way valve 10 by means of which the chamber 9 can also be evacuated. The chamber 9 is shown with air of the pressure $P_1$. The force acting on the under side of the piston 2 is designated $F_1$ and is equal to P times $A_1$, where the area of the piston 2 is $A_1$.

According to the invention a force transmitting means 12 is arranged in the form of a piston 13 according to FIG. 1 which is connected with the cylinder 1 by a rod 14 and acts in a cylinder 15. This is preferably filled with an incompressible pressure fluid and is associated with a pressure regulating means 17 via a conduit 16.

Thus, the force transmitting means 12 will absorb the outer forces F and $F_4$ and measure the resultant force $F_3$ thereof, which resulting force is converted into a control signal—pressure signal led to the pressure regulating means 17 via the conduit 16. The pressure regulating means 17 adjusts the pressure $P_1$ in the conduit 8 so that this is proportional to the resulting force $F_3$.

Through the invention now described in connection with FIG. 1 it is possible to stop the piston 2 any where in the cylinder 1 in a fixed position without any outer mechanical locking means. when the piston 2 is still, there is balance in the system, and the following applies:

$$F + F_4 = F_3$$

$$F + F_2 = F_1$$

where
 $F_1 = p_1 \cdot A_1$ and
 $P_1 = constant \cdot F_3$
Thus, $F + F_4 = p_1 / constant$ $F + F_2 = p_1$ i.e.

$F + F_4 = 1$

------  ---------------

$F + F_2 = constant \cdot A_1$

The equation is satisfied by $F_2 = F_4$

In order to achieve an upward motion of the piston 2 for instance, the valve 7 is adjusted so that the chamber 6 is evacuated. The pressure in the chamber 9 will then move the piston 2 upwards.

In view of the fact that the force transmitting means 12 is actuated by the initial pressure $F_4$ and generates a pressure via the pressure regulating means 17 which is adapted to the pressure $P_2$ the motion will cease when air is again supplied to the chamber 6 via the valve 7.

A downward motion of the piston 2 will be obtained by reversing the valve 10 so that the chamber 9 is evacuated. The motion velocity of the piston is preferably adjusted by means of throttle valves 18 and 19, for example arranged in the respective multi-way valves 7 and 10.

As soon as the piston rod 3 is loaded by an arbitrary outer force F—a load on the outer means, the force transmitting means 12 is actuated so that the pressure $P_1$ is raised in a corresponding degree meaning that the piston 2 remains still. This also applies if the force F is directed in an opposite direction than shown in FIG. 1 because the force transmitting means is then unloaded and the pressure $P_1$ is reduced in a corresponding degree.

It is to be understood that the different components described here are components obvious to one skilled in the art and have therefore not been described in detail as their are no special characteristic features of the invention. Of course the invention can also be modified within the scope of this and another type of force transmitting means is shown in FIG. 2.

Figure 2:
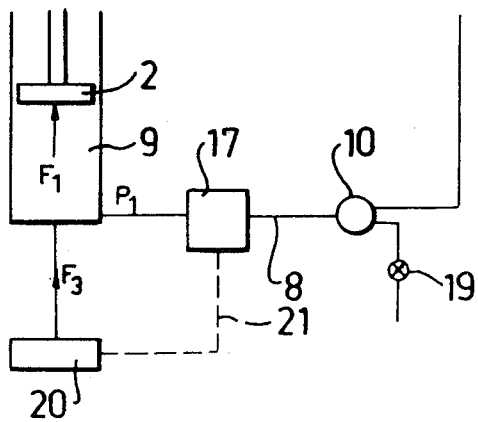
FIG. 2 shows a second variation of the invention.

Thus, a force transmitting means in the form of a load cell 20 is shown in FIG. 2 which emits an electric signal to the pressure regulating means 17 via a conductor 21, the strength of the signal being proportional to the load $F_3$.

Figure 3:
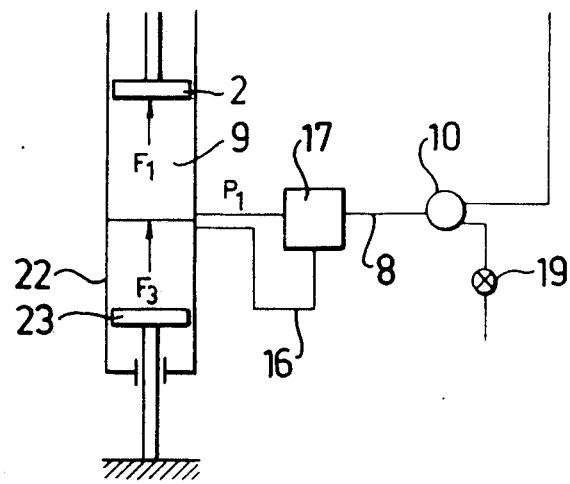
FIG. 3 shows a third variation of the invention and FIG. 4 a fourth variant of the invention.

FIG. 3 shows another variant of the invention in which a force transmitting means can be compared to that shown in FIG. 1 but where the cylinder 22 thereof is connected to the compressed-air cylinder 1 and its piston 23 is fixed in space. The function will in principle be the same as described in connection with FIG. 1.

Figure 4:
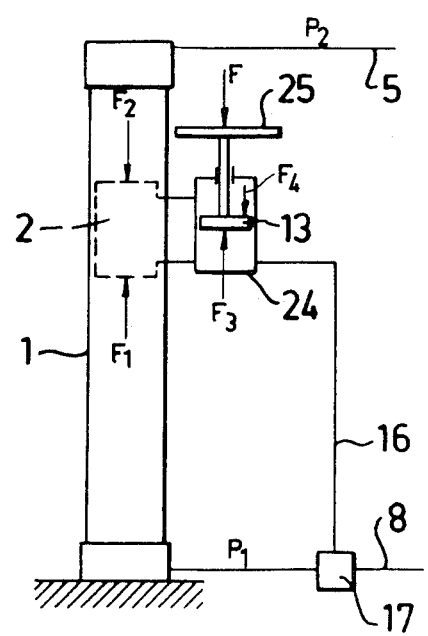

Finally, FIG. 4 shows the invention utilized with a slot cylinder or cylinder 1 without piston rod, the piston 2 of which supports a yoke extending through a slot running along the cylinder. According to this variation of the invention the force transmitting means 24 is arranged to be attached to the yoke of the piston 2. The force transmitting means 24 has the shape of a cylinder, the piston 13 of which is connected via its piston rod e.g. with a load-absorbing plate 25. Also in this embodiment the previously mentioned forces will appear and the function will be the same as described above.

As indicated above it is obvious to one skilled in the art that the force transmitting means described in connection with FIG. 4 of course can be replaced with a load cell.

What is claimed is:

1. A method for careful positioning of load-carrying pressure fluid cylinders, the fluid being a compressible gas such as air and the cylinder being double-acting and receiving a load-carrying piston and associated rod means for transmitting the load on the piston, characterized by a force transmitting means sensing a load on the cylinder from an outer force, which force transmitting means generates a signal corresponding to the size of the load, said signal being led to a pressure regulating means which adjusts the pressure in the cylinder in dependence on the signal to balance a force acting on the piston rod means and positioning the load-carrying piston in a stationary position relative to the cylinder, wherein the force transmitting means is formed by a pressure fluid cylinder, the interior of which is associated with the pressure regulating means via a pressure fluid passage.

2. The method of claim 1, characterized in that pressure regulating means actuates the pressure ($P_1$) on one side of the piston while a turning-on pressure on the other side of the piston has a constant value.

3. The method of claim 1 characterized in that the force transmitting means is loaded by a constant force ($F_4$) in order to maintain a superimposed initial pressure on said one side of the piston.

4. A device for adjusting load-carrying pressure fluid cylinders, the fluid being a compressible gas such as air and the cylinder being double acting and receiving a piston, characterized by a force transmitting means sensing the forces acting on the cylinder from an outer load, that a pressure regulating means is arranged in the pressure fluid line to one of the chambers of the cylinder and that the pressure regulating means can be actuated by the force transmitting means in order to adjust the pressure in the chamber in dependence of the size of the forces acting on the cylinder wherein the force transmitting means comprises a pistoncylinder arrangement the piston of which is connected with the pressure fluid cylinder and the working medium of which is an incompressible liquid which is associated with the pressure regulating means via a conduit.

* * * * *